Patented Mar. 2, 1937

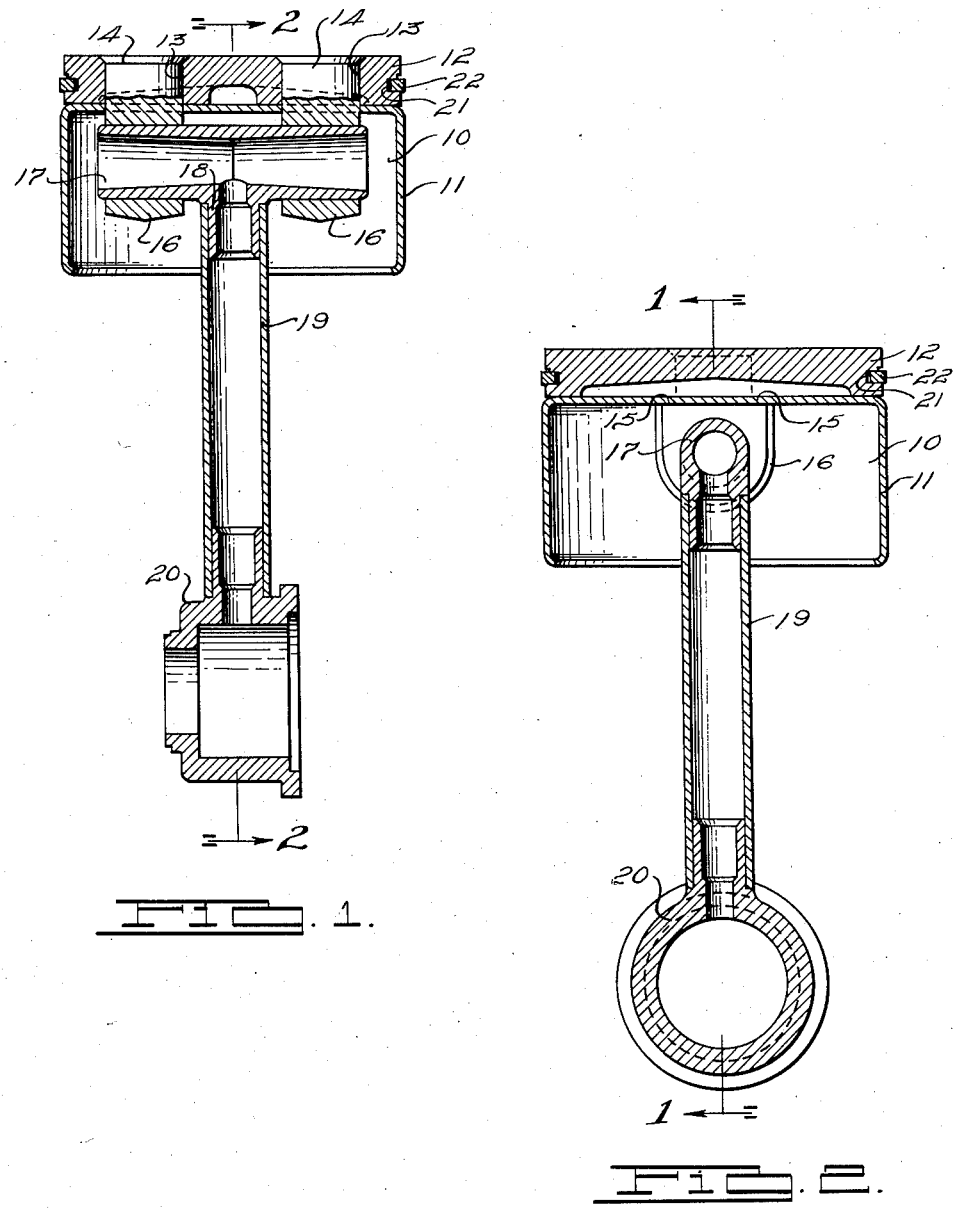

2,072,373

UNITED STATES PATENT OFFICE 2,072,373

PISTON, AND PISTON AND CONNECTING ROD ASSEMBLY

Roger K. Lee, Highland Park, Mich., assignor to Chrysler Corporation, Detroit, Mich., a corporation of Delaware Original application February 16, 1933, Serial No. 657,146. Divided and this application May 19, 1934, Serial No. 726,486

3 Claims. (Cl. 309—16)

This invention relates to internal combustion engines and refers more particularly to improvements in pistons, and piston and connecting rod assemblies.

This application is a division of my co-pending application Serial No. 657,146, filed February 16, 1933.

One object of my invention is to provide a piston, and piston and connecting rod assembly of improved characteristics whereby the engine may be successfully operated at speeds materially higher than the usual speeds of conventional engines used for driving motor vehicles, for example. While my improved piston, and piston and connecting rod assembly are not necessarily limited in their application to such high speed engines, my improvements are particularly adapted to such applications.

A further object of my invention is to provide an improved piston, and piston and connecting rod assembly of unusually light weight, these structures at the same time affording the strength requisite for high speed operation.

The desired increase in engine speeds over conventional practice is, among other things, limited by loads produced by the weight of the reciprocating parts experienced at the connecting rod bearings, such loads greatly increasing in magnitude as the speed of piston reciprocation increases; also by the sliding friction of the piston in the cylinder largely occasioned by the use of four or more sealing rings required in conventional pistons.

A further object of my invention is to overcome the aforesaid difficulties limiting engine operation at relatively high speeds by providing a piston, and piston and connecting rod assembly of improved construction.

While my improved piston and connecting rod structures are especially adapted for operation as an assembled unit, my piston may, if desired, be used to advantage with other connecting rod structures and likewise my connecting rod may be used with other piston structures.

A still further object of my invention resides in the provision of an improved piston having composite head and skirt portions connected or joined to form substantially a unitary structure, together with a novel form of connection between the piston pin bosses and the piston head.

Another object of my invention is to provide an improved piston construction which, under the temperatures and other operating conditions, will not produce local stresses and distortions heretofore giving rise to oil pumping and leakage, relief of oil cushion, piston slap, piston wear, and other objectionable commonly experienced characteristics. I preferably provide a cylindrical piston skirt free from boss openings, slots, perforations and the like which have heretofore largely contributed to the aforesaid objectionable characteristics.

In order to realize the improvements afforded by my piston, I have further provided improved means for attaching the piston pin carrying bosses to the piston head, the bosses and head being preferably formed of the same material or materials having the same coefficients of expansion whereby the piston parts will not relatively separate. Such separation in pistons subjected to unusually high speed operations would quickly give rise to piston failures.

I have also provided improved means for insuring accurate alignment of the bosses, piston head, and piston pin by assembling the pin and bosses prior to attachment of the bosses to the piston.

Further objects and advantages of my invention will be more apparent from the following detailed description of one illustrative embodiment thereof, reference being had to the accompanying drawing, in which:

Fig. 1 is a sectional elevational view of my piston, and piston and connecting rod assembled as an operating unit, the section being taken along the line 1—1 of Fig. 2.

Fig. 2 is a like section at right angles to the Fig. 1 section, the view being taken along the line 2—2 of Fig. 1.

Referring to the drawing, the piston 10 is made up of a skirt portion 11 and a head portion 12, both being of aluminum or similar light weight metal or alloy. The cylindrical skirt portion 11 is in the form of a pressed metal cylinder having a closed top end which may be welded or otherwise suitably bonded to the head portion 12 so that, after assembly, the head and skirt are the equivalent of a unitary structure. The closed end portion of the skirt member 11 and the head member 12 are provided with aligned openings 13 for the reception of projecting lug members or posts 14 of piston pin bosses of similar material which are welded or otherwise securely bonded to the head member 12. Thus the upper ends of openings 13 may be beveled to receive the weld puddle. The piston pin bosses thus depend from the head portion within the skirt portion and spaced therefrom. The bosses have shoulders 15 engaging the under face of the closed end portion of skirt 11 as shown in Fig. 2 to limit upward movement of the bosses. The piston pin bosses thus also serve to secure the skirt portion 11 to the head portion 12.

The cylindrical skirt 11 depends from the head 12 and is preferably imperforate, being free from boss openings, slots, perforations, and the like. Thus, the skirt maintains a good true fit with the cylinder without tendency to destroy the desired oil film. Heretofore it has been customary to provide openings or slots in the skirts of pistons but this results in relief of the oil film with accompanying piston slap and undue wear of the piston and cylinder rubbing surfaces. Furthermore the aforesaid conventional openings, slots, and the like produce local stresses and distortions in the piston when subjected to the operating temperatures and this in turn results in a tendency to oil pumping which requires a relatively large number of sealing rings to check the escape of oil. Each added sealing ring materially lowers the power output of the engine by reason of the additional friction loss and wear occasioned by the ring expanding against the cylinder.

The piston pin bosses also include annular bearing members 16 in which a piston pin 17 is journaled. An integral radially disposed lug 18 projects from the center portion of the piston pin 17 to provide a rigid T-shaped piston pin and is secured by welding or other suitable expedient to a main tubular rod member 19 of the connecting rod structure. The piston pin 17 and its integral lug 18 are cored so as to lighten the construction of the elements, the walls of the pin tapering from the interior to the marginal edges thereof. It will thus be apparent that the piston pin 17 is formed unitary with the connecting rod 19.

After the piston pin bosses and piston pin have been machined and the bosses have been mounted on the tapered ends of the piston pin 17, the rod and piston pin bosses are then assembled to the piston head and the lugs 14 welded to the piston head. It will be apparent that the connecting rod is securely held assembled with the piston and since the pin 17 and bosses are assembled before connection to the piston head, the desired accurate alignment of the parts is provided.

An annular unitary bearing member 20 of suitable form to receive the crank pin (not shown) is permanently secured to the tubular member 19 by welding or other suitable expedient. The connecting rod structure by itself, apart from its novel cooperative relationship with the piston, forms the subject matter of my co-pending application Serial No. 730,433, filed June 13, 1934. The one-piece or unitary bearing 20 is especially desirable in permitting a plurality of connecting rod assemblies to engage a single crank pin which may be of cantilever form in the case of radially arranged engine cylinders, although my invention is not limited in its useful and improved applications to any particular type of engine.

In the above construction, the piston, piston pin and connecting rod form a permanently united assembly which may be assembled in the engine cylinder, removed therefrom or replaced as a single unit.

The head portion 12 of the piston 10 is provided with a ring groove 21 for the accommodation of a piston ring 22. In this connection it is noted that the engine is designed to rotate at a relatively high speed in some instances as high as approximately 10,000 R. P. M. in which case, with a reasonably close fit of the pistons within the cylinders, rings are not required to maintain the proper compression within the cylinder and to prevent undue escape of oil past the pistons to the same degree as in conventional engines. The clearance spaces between the piston and cylinder constitute fixed orifices, the capacity of which will be exceeded and thus will allow only a relatively small amount of leakage by the piston when the latter is traveling at a high rate of speed. The single ring 22 is provided in the piston mainly to insure even operation of the motor at or near idling and relatively low running speeds.

The use of a single ring for each piston of the engine makes a marked reduction in the amount of force required to actuate the movable parts of the engine. In the conventional engine, with three or four rings for each piston, the friction between the rings and the cylinder wall accounts for approximately 25% of the effort required to operate the movable parts of the engine when the cylinder head is removed. Since each ring exerts pressure on the cylinder walls, the present construction effects a marked reduction in the frictional resistance between fixed and movable parts of the engine. Thus, the mechanical efficiency of the engine is increased both by the reduction of the number of rings employed for the piston and also by the reduction in the weight and accordingly the reduction in the inertia of the piston, piston pin and connecting rod elements. As hereinbefore pointed out, my improved piston with the cylindrical imperforate skirt greatly contributes toward maintaining the desired fit of the piston in the cylinder which in turn permits the use of a lesser number of sealing rings than in conventional pistons.

What I claim is:

1. In a piston having head and skirt portions, said head portion having a flat face and a pair of diametrically spaced openings extending through said head portion and opening outwardly at said flat face, a pair of piston pin bosses each having a flat shoulder engaging one of said portions, said bosses each having an integral projection extending above the shoulder thereof and entering one of said openings, the outer ends of said projections substantially filling said openings respectively and lying flush with said piston face, said bosses serving to retain said head and skirt portions in assembled position.

2. In a piston having head and skirt portions, said head portion having a flat face and a pair of diametrically spaced openings extending through said head portion, bosses having aligned openings and projections extending thereabove and respectively entering said openings, the outer ends of said projections filling said openings and lying flush with said piston face, said bosses serving to retain said head and skirt portions in assembled position.

3. In a piston including head and skirt portions, said head portion having a flat face and an opening therethrough, a member seated in said opening, said member including a piston pin boss depending within said skirt portion and spaced therefrom, the outer end of said member filling said opening and lying flush with said piston face, said member serving to retain said head and skirt portions in assembled position.

ROGER K. LEE.